June 9, 1925.
C. C. BLACKMORE
SHOCK ABSORBER
Filed Jan. 16, 1922
1,541,101
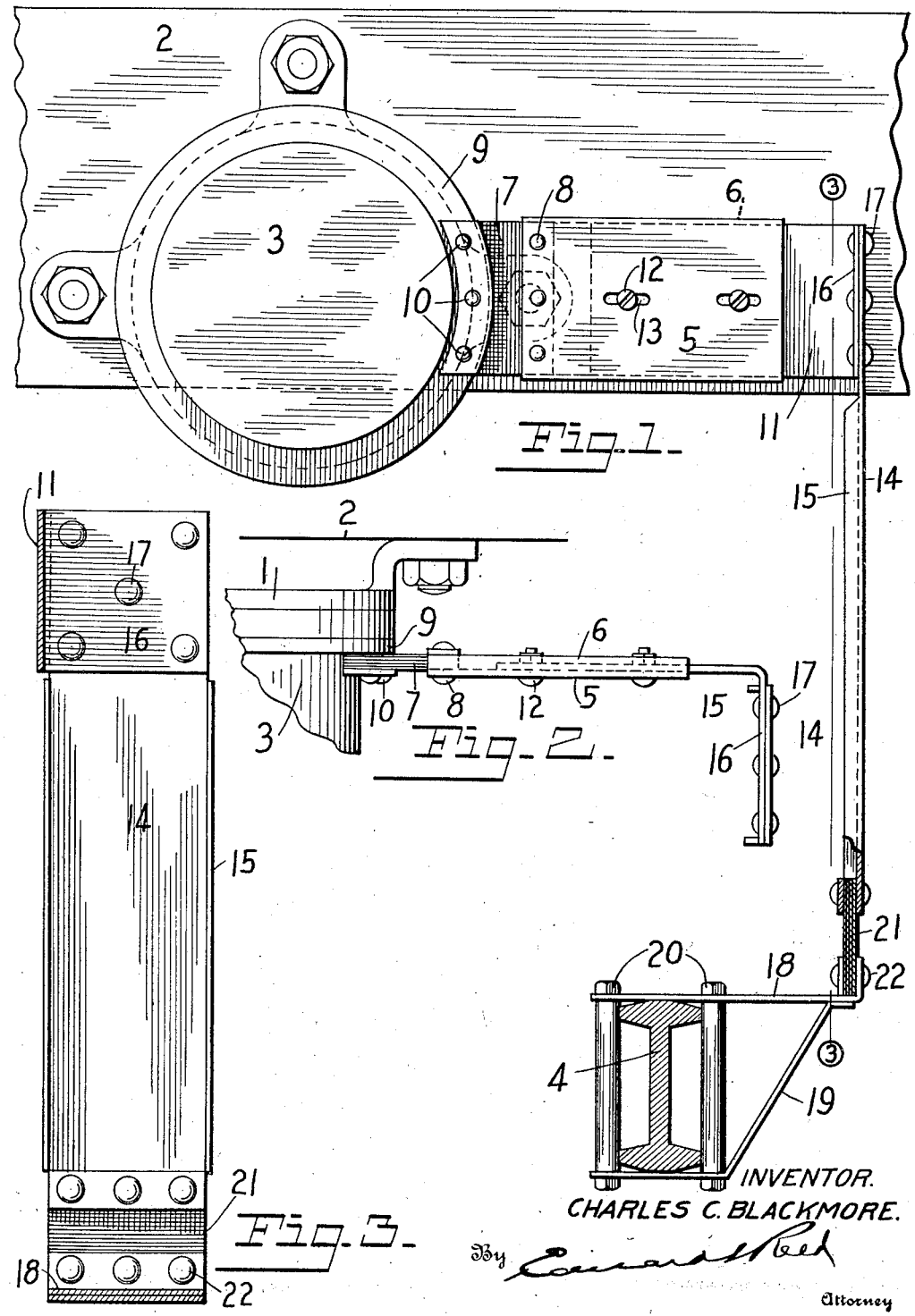
INVENTOR.
CHARLES C. BLACKMORE.
By
Attorney Patented June 9, 1925.

1,541,101

UNITED STATES PATENT OFFICE.

CHARLES C. BLACKMORE, OF DAYTON, OHIO.

SHOCK ABSORBER.

Application filed January 16, 1922. Serial No. 529,563.

*To all whom it may concern:*

Be it known that I, CHARLES C. BLACKMORE, a citizen of the United States, residing at Dayton, in the county of Montgomery and State of Ohio, have invented certain new and useful Improvements in Shock Absorbers, of which the following is a specification, reference being had therein to the accompanying drawing.

This invention relates to shock absorbers and the like and more particularly to the means for connecting such a device with an axle or other structure capable of movement relatively thereto.

The movable member of a shock absorber is usually connected with the axle or other part of the automobile by means of an actuating arm which is connected with the movable member of the shock absorber and with a connecting arm which in turn is connected with the axle. The axle and the frame on which the shock absorber is mounted have relative horizontal movements as well as vertical movements and in order to permit of these movements it has been customary to connect the vertical connecting arm, or rod, with the actuating arm and axle by pivotal connections, or universal joints. As these joints wear they become loose and rattle and are otherwise objectionable.

One object of the invention is to provide such a connecting means which will cause the necessary movement to be imparted to the shock absorber and will permit the relative movements of the axle and shock absorber without the use of pivotal connections or universal joints.

A further object of the invention is to provide such a connecting means, the several parts of which will be rigidly connected one to the other, and will embody in themselves flexible portions to permit of the relative movements of the axle and the shock absorber.

Other objects of the invention will appear as the device is described in detail.

In the accompanying drawings Fig. 1 is a side elevation, partly broken away, of a connecting device embodying my invention; Fig. 2 is a top plan view of the same; and Fig. 3 is a section taken on the line 3—3 of Fig. 1.

In these drawings I have illustrated one embodiment of my invention and have shown the same as applied to a shock absorber similar to that shown and described in Patent No. 1,395,471, granted to me Nov. 1, 1921, which consists of a fixed member 1 adapted to be rigidly secured to the frame 2, or other part, of an automobile, and a movable member 3 mounted upon the fixed member and yieldably held in frictional contact therewith so as to resist the relative movements of the frame 2 and the axle 4, or other part with which the movable member is connected. It will be understood, however, that the invention may be applied to shock absorbers of various kinds and other similar devices and that it is here shown as applied to this particular shock absorber for the purposes of illustration only.

The movable member 3 of the shock absorber has secured thereto an actuating arm which preferably extends in a substantially horizontal position and is adapted to be connected with the axle 4 or other part movable relatively to the frame 2. In carrying out my invention I provide this arm with a flexible portion of such a character that it will permit the movement of the arm about a transverse axis parallel with the plane thereof, without permitting the movement of the arm relatively to the movable member of the shock absorber about an axis extending through the plane of the arm. Preferably the arm consists of a body portion 5 which is here shown as a flat strip of sheet metal having at its edges flanges 6 to stiffen and strengthen the same. This arm has rigidly secured thereto and interposed between the same and the movable member 3 of the shock absorber a section of flexible material 7 which is preferably flat and may be of such a width as to fit between the flanges 6 of the arm and may be secured thereto by means of rivets 8 or other suitable connecting devices. The other end of the section of flexible material 7 is secured to a flange 9 forming part of the movable member of the shock absorber, the connection preferably being formed by means of rivets 10 or similar devices. The flexible portion of the actuating arm may be formed of any suitable material but I prefer to use a fabric which has been so treated as to impart thereto the necessary strength without destroying its flexibility. Rubberized fabric, such as is used for universal joints, is well adapted for this purpose, as it is of a strong, durable character and will not yield appreciably to force applied to the edges thereof but will yield about an axis parallel with its plane sufficiently for the present purpose. Further, it is inexpensive and can be very quickly and easily built into the arm and attached to the shock absorber.

While I have shown the flexible material as connected directly with the movable member of the shock absorber this is not essential as it is possible to interpose it at other points in the arm.

When the device is built for installation on a single car where the dimensions are established the actuating arm may be of a fixed length, but where the device is intended for application to any one of a number of different makes of cars it is desirable that this arm should be adjustable so as to accommodate it to the different dimensions of different cars. I have, therefore, shown the arm as formed in two parts and to this end have mounted on the body portion 5 thereof a extensible member 11 which fits snugly between the flanges 6 and is connected with the body portion by means of bolts 12 extending through slots 13 so that it can be rigidly secured thereto in adjusted positions, thereby rendering the actuating arm of variable length.

The actuating arm is connected with the axle or other movable part of the automobile by means of a connecting rod, or vertical arm, 14, which is also shown in the present instance as formed of sheet metal and provided along its intermediate portion with flanges 15 to reinforce and stiffen the same. The upper end of this connecting arm is rigidly secured to the outer end of the actuating arm, in the present instance to the outer end of the extensible part 11 of the arm. To this end the part 11 of the arm is provided with a laterally extending portion 16 and the upper end of the connecting arm 14 overlaps and is rigidly secured to this laterally extending portion by means of rivets 17, or the like. The lower end of the connecting arm 14 is preferably connected with the axle 4 by means of a suitable bracket which, as here shown, is formed of sheet metal and as comprising a horizontal plate 18 and a bracing plate 19, extending respectively above and below the axle and clamping thereto by bolts 20. I also prefer to establish a flexible connection between the connecting arm and the bracket carried by the axle and to this end I have provided the arm 14 with a flexible portion 21 similar to the portion 7 of the actuating arm. This section of flexible material is shown as riveted at its upper end to the lower portion of the arm 14 and riveted at its lower end to an upturned flange 22 on the bracket 18.

It will be apparent, therefore, that I have provided connecting means of this character which will have all the strength and rigidity necessary to impart the usual movement to the movable member of the shock absorber but which will be capable of movements to accommodate itself to the relative movements of the frame and axle in a substantially horizontal direction, whether these movements be lengthwise of the frame or transverse thereto, and that the connections are of such a character that there are no parts to become loose due to wear or otherwise and rattle. Further, the construction is very simple, easily manufactured and can be produced at a low cost.

Further it will be understood that the invention may be applied to shock absorbers of various kinds, or to other devices; that the actuating member or arm may be connected with the axle, or corresponding structure, in various ways, the connecting arm not being necessary in all cases; and that the flexibility of the arm may be imparted thereto in various ways. Therefore, while I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. The combination with a shock absorber comprising a movable member, of a substantially horizontal arm connected with said movable member and having a portion capable of bending about a vertical axis, a substantially vertical arm connected with said horizontal arm and capable of bending about a horizontal axis, and means for connecting said vertical arm to a structure having movement relatively to said shock absorber.

2. The combination with a shock absorber comprising a movable member, of a substantially horizontal arm connected with said movable member and comprising a rigid portion, and a portion flexible only in a direction transverse to the plane of movement of said arm, and a substantially vertical arm to connect said horizontal arm with a structure having movement relatively to said shock absorber, said vertical arm also comprising a rigid portion and a portion flexible only in a direction transverse to the plane of movement of said vertical arm.

3. The combination with a shock absorber comprising a movable member, of an actuating arm for said movable member comprising a flat section of material which is flexible only about a transverse axis substantially in the plane thereof, and means for connecting said arm with a structure having movement relatively to said shock absorber.

4. The combination with a shock absorber comprising a movable member, of an actuating arm for said movable member and a connecting arm rigidly secured to said actuating arm and connected with a structure movable relatively to said shock absorber, each of said arms comprising a section of flat material which is flexible only about a transverse axis parallel to the plane thereof.

5. The combination with a shock absorber comprising a movable member, of an actuating arm for said movable member comprising a rigid portion and a section of flat flexible material interposed between said rigid portion and said movable member substantially in the plane of movement of said arm, and means for connecting said actuating arm with a structure movable relatively to said shock absorber.

6. The combination with a shock absorber comprising a movable member, of an actuating arm for said movable member, a second arm for connecting said actuating arm with a structure movable relatively to said shock absorber, said second arm comprising a rigid portion and a section of flat flexible material interposed between said rigid portion and said structure substantially in the plane of movement of said arm.

7. The combination with a shock absorber comprising a movable member, of an actuating arm for said movable member having a rigid portion and a section of flat, flexible material interposed between said rigid portion and said movable member, a second arm for connecting said actuating arm with a structure movable relatively to said shock absorber, said second arm having a rigid portion and a section of flat flexible material interposed between said rigid portion and said structure.

8. The combination with a shock absorber comprising a movable member, of an actuating arm for said movable member having a rigid portion and a section of flat flexible material interposed between said rigid portion and said movable member, a second arm for connecting said actuating arm with a structure movable relatively to said shock absorber, each of said arms comprising a flat body portion and a section of fabric rigidly secured to said body portion.

9. The combination with a shock absorber comprising a movable member, of an actuating arm comprising a flat metallic section, and a flat section of flexible material rigidly secured to said metallic section in a position substantially parallel therewith, and a connecting arm extending between said actuating arm and a structure movable relatively to said shock absorber.

10. The combination with a shock absorber comprising a movable member, of an actuating arm comprising a flat metallic section and a flat section of flexible material rigidly secured at one end to said metallic section and at its other end to the movable member of said shock absorber, a connecting arm comprising a flat metallic section rigidly secured to the metallic section of said actuating arm, and a section of flat flexible fabric rigidly secured at one end to the metallic section of said connecting arm and connected at its other end with a structure movable relatively to said shock absorber.

11. The combination with a shock absorber comprising a movable member, of an actuating arm comprising a two-part metallic section, the two parts of which are adjustably connected one to the other, a section of flexible material interposed between said metallic section and the movable member of said shock absorber, and means for connecting said metallic section with a structure movable relatively to said shock absorber.

12. The combination with a shock absorber comprising a movable member and a bracket adapted to be rigidly secured to an axle or the like, of an actuating arm comprising a flat metallic section having at its outer end a laterally extending portion, a section of flat flexible material rigidly secured at one end with the inner end of the metallic section of said arm and rigidly secured at its other end with the movable member, of said shock absorber, a connecting arm comprising a flat metallic section having a portion overlapping and rigidly secured to the laterally extending portion of the actuating arm, and a section of flat flexible material having one end secured to said connecting arm and having its other end secured to said bracket.

In testimony whereof, I affix my signature hereto.

CHARLES C. BLACKMORE.